United States Patent [19]
Brunson

[11] Patent Number: 5,781,614
[45] Date of Patent: Jul. 14, 1998

[54] MESSAGE RETRIEVAL VIA ALTERNATIVE ACCESS

[75] Inventor: Gordon Richards Brunson, Broomfield, Colo.

[73] Assignee: Lucent Technologies Inc., Murray Hill, N.J.

[21] Appl. No.: 588,954

[22] Filed: Jan. 19, 1996

[51] Int. Cl.⁶ ............................................. H04M 1/64
[52] U.S. Cl. .................... 379/88; 379/90.01; 379/93.01; 379/93.24
[58] Field of Search ................. 379/67, 88, 89, 379/90.01, 93.01, 93.08, 93.09, 93.15, 93.24, 100.01, 100.08, 100.13, 201; 358/402

[56] References Cited

U.S. PATENT DOCUMENTS

| | | | |
|---|---|---|---|
| 4,837,798 | 6/1989 | Cohen et al. | 379/88 |
| 4,910,765 | 3/1990 | Matsuse et al. | 379/100.13 |
| 4,939,771 | 7/1990 | Brown et al. | 379/67 |
| 4,996,704 | 2/1991 | Brunson | 379/67 |
| 5,146,488 | 9/1992 | Okada et al. | 379/88 |
| 5,291,302 | 3/1994 | Gordon et al. | 358/400 |
| 5,333,266 | 7/1994 | Boaz et al. | 395/200 |
| 5,351,276 | 9/1994 | Doll, Jr. et al. | 379/67 |
| 5,353,259 | 10/1994 | Howes et al. | 369/25 |
| 5,406,557 | 4/1995 | Baudoin | 370/61 |
| 5,459,775 | 10/1995 | Isono et al. | 379/88 |
| 5,479,411 | 12/1995 | Klein | 379/88 |
| 5,481,597 | 1/1996 | Given | 379/67 |
| 5,497,373 | 3/1996 | Hulen et al. | 379/89 |
| 5,524,137 | 6/1996 | Rhee | 379/67 |
| 5,530,740 | 6/1996 | Irribarren et al. | 379/89 |
| 5,557,659 | 9/1996 | Hyde-Thomson | 379/88 |
| 5,559,721 | 9/1996 | Ishii | 364/514 A |
| 5,608,786 | 3/1997 | Gordon | 358/402 |
| 5,623,538 | 4/1997 | Petty | 379/67 |
| 5,630,060 | 5/1997 | Tang et al. | 379/89 |
| 5,633,916 | 5/1997 | Goldhagen et al. | 379/67 |
| 5,647,002 | 7/1997 | Brunbson | 379/67 |
| 5,657,461 | 8/1997 | Harkins et al. | 395/333 |

OTHER PUBLICATIONS

Active Voice Corp., Repartee® Training Guide, Version 6.0, 1988–90, pp. 1–10.

*Primary Examiner*—Krista Zele
*Assistant Examiner*—Scott L. Weaver
*Attorney, Agent, or Firm*—David Volejnicek

[57] ABSTRACT

A multi-media messaging system (106) provides multi-media message access capability to non-subscriber message recipients (126) who lack multi-media message-reception capability. When a message originator (100) who is a subscriber requests a message to be sent to a recipient's address, the messaging system determines whether the recipient is able to receive at this address all of the media in which the message is expressed. If not, the messaging system saves the message for the recipient, assigns an identifier/password to the message, and creates a substitute message containing any components of the original message that are expressed in media which the recipient is able to receive at the address, along with the password and instructions on how to log into the sending messaging system. The messaging system then sends this substitute message to the recipient's address. When the recipient follows the instructions and logs into the sending messaging system with the password, the messaging system allows the recipient to access only the original message. Following this access, or if the access is not made within a predetermined time period, the messaging system deletes the original message.

54 Claims, 3 Drawing Sheets

5,781,614

MESSAGE RETRIEVAL VIA ALTERNATIVE ACCESS

TECHNICAL FIELD

This invention relates to telecommunications messaging systems.

BACKGROUND OF THE INVENTION

Telecommunications messaging systems are well-known in the art. Examples include voice message systems, electronic mail (e-mail) systems, and facsimile (fax) systems. Until recently, most of the telecommunications messaging systems have been mono-media systems. That is, they have been able to handle only messages expressed in a single predetermined medium. Recently, multi-media messaging systems have come into use. As their name implies, these systems are capable of handling messages expressed in one or more of a plurality of media, such as audio, text, fax, binary file, and motion video. An illustrative example of a multimedia messaging system is the AT&T Intuity® system.

Large numbers of mono-media messaging systems remain in use. And even the early multi-media systems are not capable of handling all of the variety of message media that are becoming common. This creates a significant impediment to the adoption of modern multi-media messaging systems, and the impediment is self-reinforcing: if many destinations are incapable of receiving or handling multimedia messages, then message originators forego creating multi-media messages; but if few multi-media messages are being created and sent, there is little incentive to upgrade the messaging infrastructure to support multi-media messages. Of course, if the messaging environment were homogeneous, with all messaging systems and subscribers having the same messaging capabilities, this problem would not arise. However, the messaging environment is presently not homogeneous, and is not likely to become so anytime soon. Consequently, in order to be truly effective communication tools, modern multi-media messaging systems must be able to exchange messages with mono-media messaging systems and the older, less-capable, multi-media messaging systems. Otherwise, the modern multi-media messaging systems are likely for some time to constitute islands of extensive multi-media messaging capability isolated from a sea of mono-media and/or limited multi-media messaging capability.

An approach taken by the messaging art to sending multi-media messages through an existing mono-media messaging infrastructure is exemplified by the MIME (multi-media Internet messaging extensions)—encoded e-mail proposed by the Internet community, and by the uu-encoded UNIX® system e-mail. These arrangements apply additional encoding to non-text message components in order to make them appear as text for purposes of transmission through the Internet or other data network and receipt at a destination messaging system. This tends to create very large text message components, especially from audio message components. But large messages may be truncated while passing through the network. So consequently, a large message may be artificially multiplexed into many smaller messages which must be re-assembled by the recipient. When these messages are received by access instruments (mail readers or client user interfaces) which are not familiar with the operations of encoding and multiplexing, the result is an ensemble of large unreadable messages. The only recourse for the recipient is to send a message back to the message originator and request that the message be sent again using only the native medium or media of the recipient's messaging system.

SUMMARY OF THE INVENTION

This invention is directed to solving these and other problems and disadvantages of the prior art. Generally according to the invention, there is provided a method and an apparatus for enabling a message recipient with only mono-media or limited multi-media capabilities to access the full multi-media contents of a message which originates with a multi-media messaging system. Illustratively, while the message that is generated by the message originator is a multi-media message, the message that is delivered to the recipient's mailbox is merely a representation of the original multi-media message in the medium or media supported by the recipient's message-receiving system, and includes additional information that gives the recipient the opportunity to access the full original message in the originating multi-media messaging system. The originating messaging system retains the original message for a specified period of time for this purpose. Alternatively illustratively, the message that is sent by the originating messaging system to the recipient's mailbox is either a copy of a portion of, or the entire, original message accompanied by the additional information. The recipient's mailbox accepts and stores whatever portions (e.g., components) of the sent message that it is able to receive and store, plus the additional information. The additional information then gives the recipient the opportunity to access the full original message in the originating multi-media messaging system.

According to one aspect of the invention, access by a message recipient to a message that is stored in a source messaging system is provided as follows: In response to a message sender requesting the source messaging system to send the stored message to the recipient, the source messaging system—either itself or an adjunct thereof—determines whether the message recipient is able to receive the message. In response to a determination that the message recipient is able to receive the message, the source messaging system sends the message to the recipient (e.g., the recipient's mailbox in the recipient's message-receiving system), but in response to a determination that the message recipient is unable to receive the message, the source messaging system instead sends to the recipient a notification of the message along with an identifier of the message. Preferably, the notification also includes instructions for accessing the original message. Then, in response to the message recipient accessing the source messaging system and providing the identifier—for example, by logging into the source messaging system with the identifier—the source messaging system provides the recipient with access in the source messaging system to the message that is identified by the identifier.

According to another aspect of the invention, access by the message recipient to the message that is stored in the source messaging system is provided as follows: In response to the message sender requesting the source messaging system to send the stored message to the recipient, the source messaging system—again, either itself or an adjunct thereof—sends to the recipient either the whole, or a part of, the message, along with an identifier of the original message in the source messaging system and preferably also instructions for accessing the message in the source messaging system. Then, in response to the message recipient accessing the source messaging system and providing the identifier, the source messaging system provides the recipient with access in the source messaging system to the entire message that is identified by the identifier.

According to another aspect of the invention, a multi-media messaging system stores a message comprising one or more message components each expressed in a different medium, and access by a message recipient to the message is provided by the multi-media messaging system as follows: In response to a message sender requesting the multi-media messaging system to send the message to an address of the message recipient, the multi-media messaging system instead sends to the address either a mere notification of the message along with an identifier/password of the message, or at least a portion of the message along with the identifier/password. Then, in response to the message recipient logging into the multi-media messaging system with the identifier/password, the multi-media messaging system provides the message recipient with access in the messaging system to all of the message components (i.e., to the entirety) of only the message that is identified by the identifier/password.

According to yet another, a more detailed, aspect of the invention, a multi-media messaging system stores a message comprising one or more message components each expressed in a different medium, and access to the message by a message recipient who is not a subscriber of the multi-media messaging system is provided by the multi-media messaging system as follows: In response to a request of a message sender who is a subscriber of the multi-media messaging system to send the message to another messaging system for the message recipient who is a subscriber of the other messaging system, the multi-media messaging system either creates a mailbox for the message recipient in the multi-media messaging system, assigns an identifier/password to this mailbox, and stores the message in this mailbox, or assigns an identifier/password to the message in the mailbox of the message sender. The multi-media messaging system also attempts to determine which media can be handled by the other messaging system, and then generates a substitute message comprising at least those message components of the original message that are expressed in media which can be handled by the other messaging system. The multi-media messaging system also includes in the substitute message the identifier/password and instructions for logging into the multi-media messaging system mailbox that stores the original message (i.e., either the mailbox that was created for the recipient or the message sender's mailbox), and then sends the substitute message instead of the original message to the other messaging system for the message recipient. In response to the message recipient logging into the multimedia messaging system with the identifier/password, the multi-media messaging system provides the message recipient with access either only to contents of the mailbox that was created for the recipient or only to the original message in the sender's mailbox, and advantageously limits the accessed mailbox's actions only to the "reply to sender" function.

In this manner, even a message recipient who does not subscribe to a multi-media messaging system and does not have multi-media message reception facilities is enabled to access multi-media messages in full. Furthermore, messaging between a multi-media messaging system and other, mono-media or less-capable multi-media, messaging systems is effected without depriving multi-media message recipients who are subscribers of only the other messaging systems of access to any components of the multi-media message. Moreover, this capability is preferably effected without media conversion of any of the multi-media message components, such that the message recipient is enabled to access each message component in its original medium.

Furthermore, the multi-media messaging system need not even know the capabilities of the recipient's messaging system in order to effect this functionality.

These and other advantages and features of the invention will become more apparent from the following description of an illustrative embodiment of the invention, taken together with the drawing.

DETAILED DESCRIPTION

Figure 1:
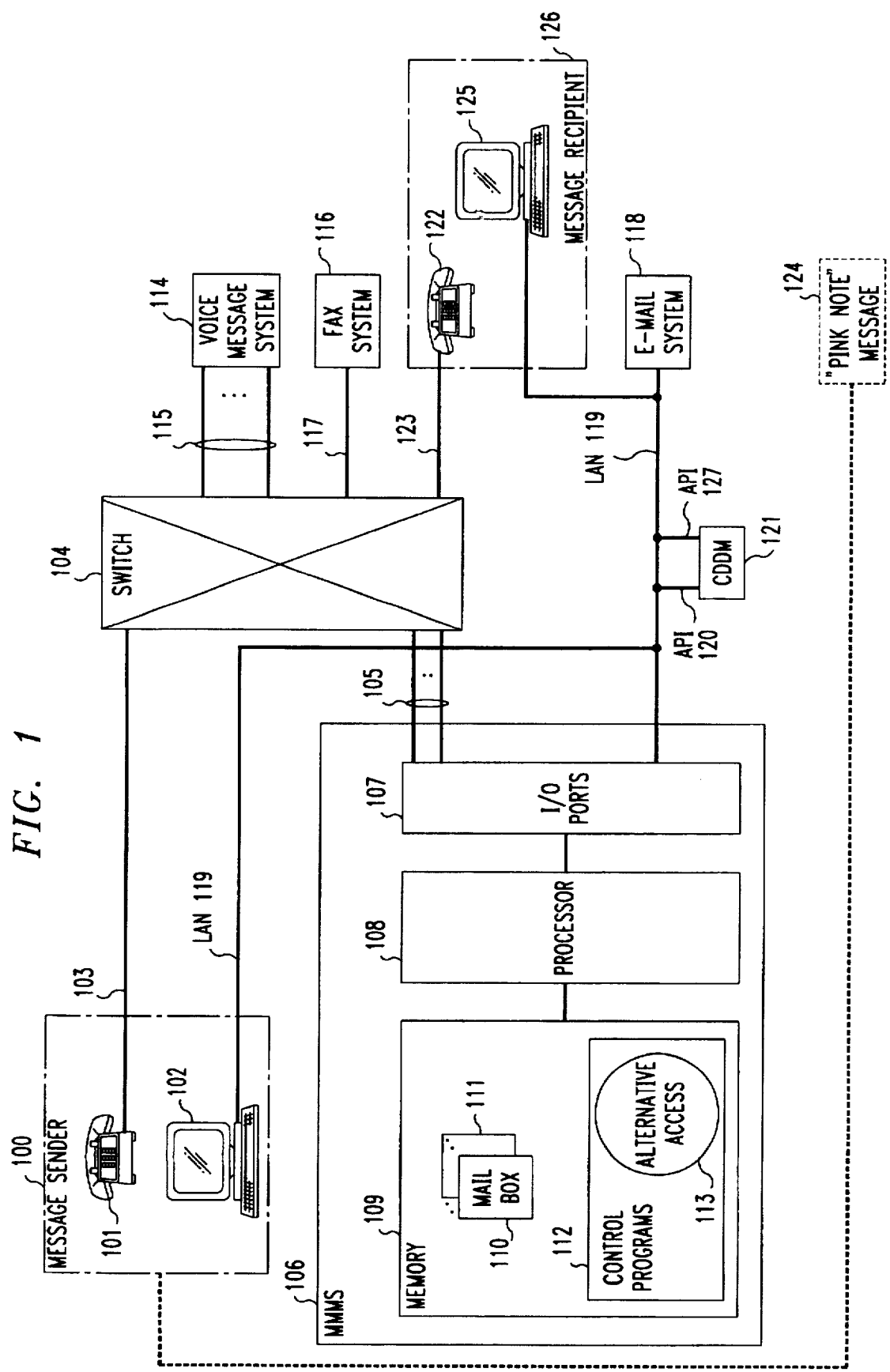
FIG. 1 is a block diagram of a messaging network embodying an illustrative implementation of the invention.

FIG. 1 shows a messaging network comprising a plurality of messaging systems: voice message system 114, fax system 116, e-mail system 118, and a manual "pink note" message "system" 124, which are all mono-media systems, plus a multi-media messaging system (MMMS) 106, such as the AT&T Intuity® system.

Systems 114, 116, and 106 are interconnected with each other and with subscribers 100 and 126 by a telecommunications switch 104, such as a private branch exchange (PBX). Voice message system 114 is connected to switch 104 by analog phone lines 115, fax system 116—which is illustratively constituted by a fax machine or a fax server—is connected to switch 104 by a telephone line 117, and MMMS 106 is connected to switch 104 by one or more subscriber lines 105, which are preferably digital telephone lines. Subscribers 100 and 126 include a multi-media subscriber 100 of MMMS 106 who is connected to switch 104 by a subscriber line 103, and a mono-media subscriber 126 of systems 114, 116, 118, and 124, who is connected to switch 104 by a subscriber telephone line 123 and to e-mail system 118 by a local area network (LAN) 119. Terminal equipment of multi-media subscriber 100 includes either a personal computer (PC) 102 connected to LAN 119 and a telephone 101, or a multi-media workstation connected to LAN 119 that includes the messaging capabilities of a PC 102 and telephone 101, for generating and receiving multi-media messages. Illustratively, the multi-media workstation may be a multi-media PC running the Intuity Message Manager application of AT&T. Terminal equipment of mono-media subscriber 126 includes a telephone 122 connected to subscriber telephone line 123 for generating and receiving audio messages, and a data terminal (or a PC) 125 connected to LAN 119 for generating and receiving e-mail messages. Subscriber 126 generates and receives faxes directly via the fax server or fax machine of fax system 116.

In an alternative configuration, system 114 may be a rudimentary multimedia messaging system capable of handling both audio and fax messages, and thus subsuming the functionality of both a voice message system and a fax system. In this configuration, terminal equipment of mono-media subscriber 126 includes a fax machine connected to switch 104 by a telephone line for generating and receiving fax messages.

MMMS 106 is a stored-program controlled machine. It comprises a memory 109 for storing control data and programs 112, a processor 108 for executing the control programs, and input/output (I/O) ports 107 for enabling processor 108 to communicate with the "outside world" via telecommunications subscriber lines 105 and a LAN 119 interface supporting an MMMS application program interface (API) 120. In the case of MMMS 106 being the AT&T Intuity system, MMMS API 120 is preferably the AT&T IMAPI interface. Memory 109 further implements mailboxes 110–111 of subscribers and other users.

As described so far, the messaging network of FIG. 1 is conventional. According to the invention, MMMS 106 is equipped with, and is connected to e-mail system 118 by, a cross-domain delivery machine (CDDM) 121 which interfaces MMMS 106 to e-mail system 118 via MMMS API 120 and e-mail API 127 across LAN 119, thereby enabling systems 106 and 118 to communicate e-mail messages to and fro. In this illustrative embodiment, CDDM 121 is substantially a message-delivery gateway between MMMS API 120 and e-mail API 127. Further according to the invention, control programs 112 of MMMS 106 include an alternative access program 113 that enables a mono-media message recipient 126 to receive multi-media messages from a multi-media message originator 100. (Because MMMS 106 is capable of handling any and all message media of systems 114, 116, and 118, communication and receipt of messages from mono-media message originator 126 by multi-media message recipient 100 is effected conventionally and presents no problem.)

Figure 2:
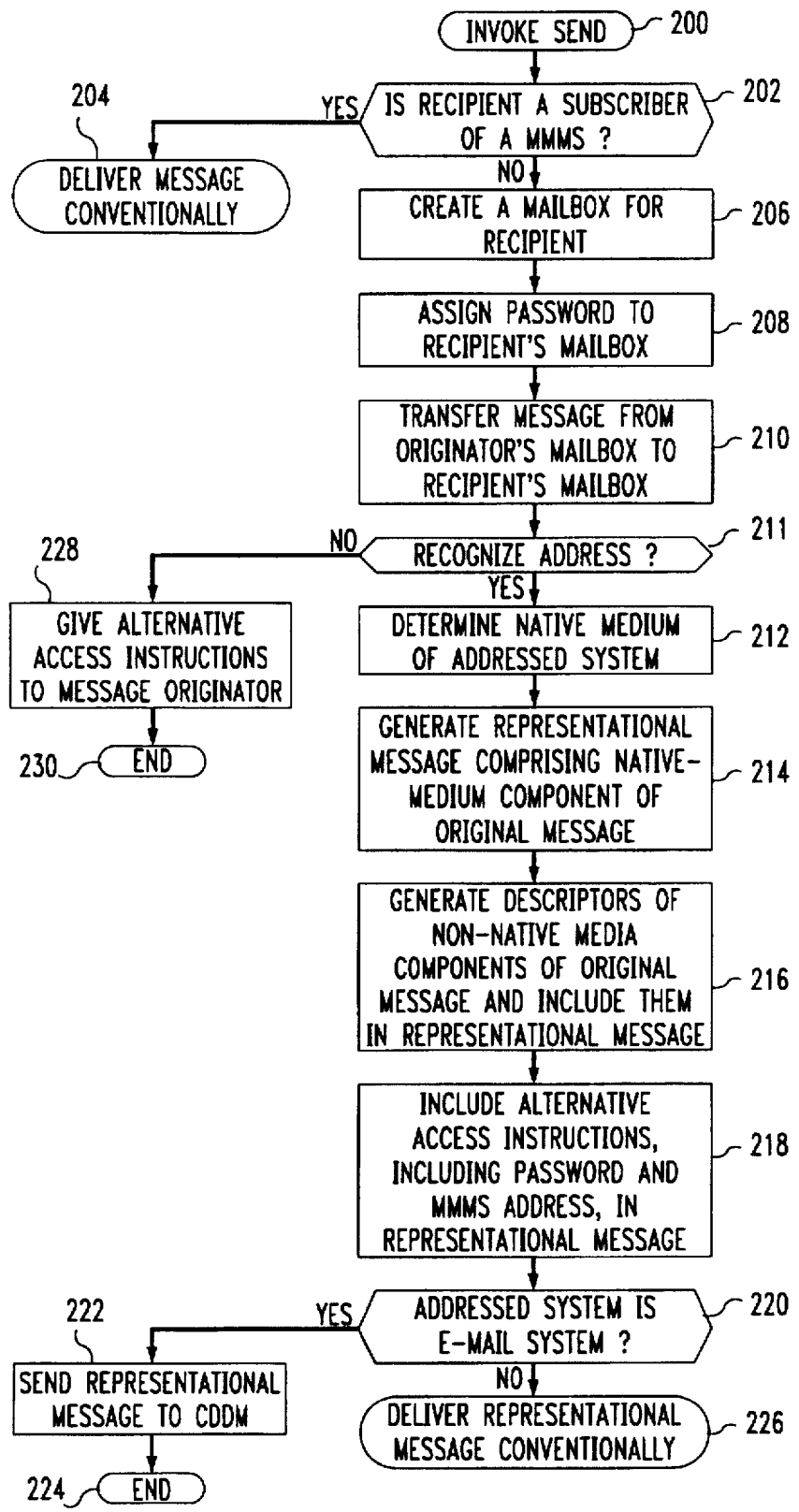
FIG. 2 is a flow diagram of alternative-access message-sending functionality of a multi-media messaging system of the network of FIG. 1.

To send a multi-media message to mono-media message recipient 126, multi-media message sender 100 originates a multi-media message conventionally in the outgoing message portion of his or her mailbox 110 in MMMS 106, conventionally addresses the multi-media message to any one of the mono-media systems 114, 116, and 118 of which the message recipient 126 is a subscriber, and then conventionally invokes a "send" function of MMMS 106 to effect delivery of the message to its address. Invocation of the "send" function results in execution of alternative access program 113 by processor 108. The message-sending functionality that is implemented thereby is shown in FIG. 2.

Upon invocation of the "send" function, processor 108 begins to execute alternative access program 113, at step 200. Processor 108 first checks the address of the message against control data in memory 109 to determine if this address corresponds to a subscriber of MMMS 106 or some other MMMS with which MMMS 106 is networked, at step 202. If so, the message can be delivered conventionally as a multi-media message. Execution of alternative access program 113 therefore ends and processor 103 executes the conventional message-sending program of MMMS 106 to conventionally deliver the message to its recipient, at step 204. If, however, the address of the message is not found at step 202 to correspond to an MMMS subscriber, processor 108 creates a new mailbox 111 in memory 109 for the message recipient 126, at step 206, assigns a unique password to this new mailbox 111, at step 208, and then transfers the message from mailbox 110 of message sender 100 into mailbox 111 of message recipient 126, at step 210. Alternatively, processor 108 may forego creating mailbox 111 and instead may merely retain the message in mailbox 110 and associate the unique password with this message in mailbox 110.

Processor 108 again accesses control data in memory 109 to determine if it has information on the address of the message, i.e., if MMMS 106 recognizes this address, at step 211. If the address is recognized, processor 108 determines from the control data what the native medium is of the destination messaging system to which the message address corresponds, at step 212. Having determined the native medium, processor 108 generates a substitute, representational, message—one which represents the original message generated by message sender 100 and which provides a notification of the existence of the original message—comprising any component of the original message which is expressed in the native medium, at step 214, which is to be delivered to the message recipient in place of the original message. Processor 108 also generates descriptors of any non-native media components of the original message and includes the descriptors in the representational message, at step 216. Illustratively, each descriptor identifies the medium and the size of the corresponding message component, and a notice that the component can be retrieved via alternative access. Processor 108 further includes in the representational message instructions on how message recipient 126 can access the original message in mailbox 111. These instructions include the address (i.e., telephone number or LAN 119 address) of MMMS 106 and the identifier/password of mailbox 111 that was assigned at step 208, at step 218. Illustratively, the instructions take the following form: "Alternative Access: The full message may be retrieved by voice, fax, and/or computer until (date) by calling (MMMS phone number) or contacting (MMMS LAN address), and entering the identifier/password (password)." Processor 108 then checks whether the addressed system is e-mail system 118, at step 220. If so, processor 108 sends the representational message to CDDM 121 and relies on CDDM 121 to make the delivery of the representational message to e-mail system 118, at step 222. Execution of alternative access program 113 then ends, at step 224. If the addressed system is not e-mail system 118, the representational message can be delivered conventionally, and so processor 108 ends execution of alternative access program 113 and instead executes the conventional message-sending program to conventionally deliver the representational message to its recipient, at step 226.

Returning to step 211, if processor 108 determines that MMMS 106 has no information on the message address and therefore does not recognize the address, processor 108 gives the alternative access instructions (see step 218) to message sender 100, at step 228. Illustratively, processor 108 does so by returning the identifier/password as a return parameter of the send function, and by adding it as a message property to the original message retained in the sender's mailbox 110. Execution of alternative access program 113 then ends, at step 230. It is now up to message sender 100 to convey the alternative access instructions to message recipient 126, illustratively by calling telephone 122 and giving the instructions to whoever answers the call. This may result in a "pink note" message 124 being generated for message recipient 126 by whoever answers the call.

Alternatively, if processor 108 determines at step 211 that MMMS 106 has no information on the message address, processor 108 includes a copy of the entire original message in the representational message, and then proceeds to steps 218 et seq., relying upon the destination system to select and store from the representational message any message components, but at least the alternative access instructions, that it is capable of receiving and storing.

Figure 3:
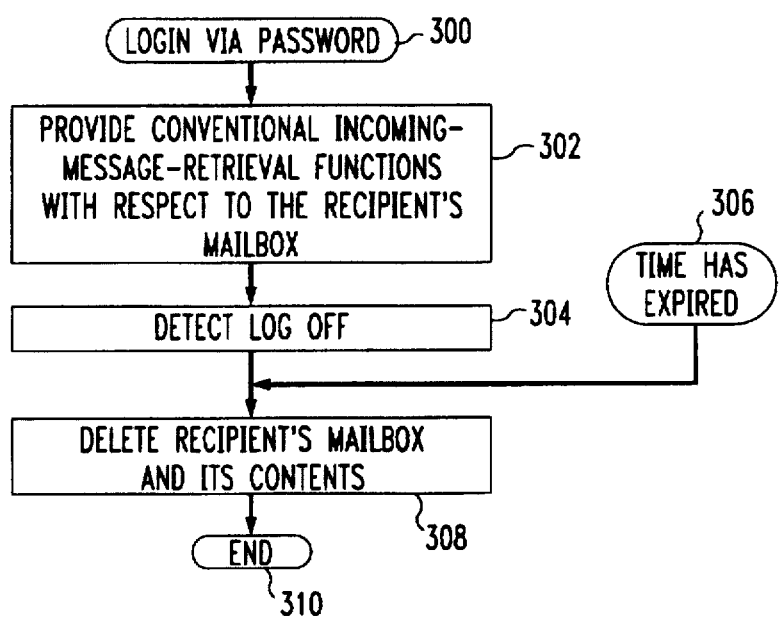
FIG. 3 is a flow diagram of alternative-access message-accessing and deleting functionality of the multi-media messaging system of the network of FIG. 1.

The alternative access by message recipient 126 to the original message stored in mailbox 111 (or mailbox 110, in the alternative embodiment) proceeds in the identical manner as a subscriber 100 of MMMS 106 would retrieve a message from the incoming portion of his or her mailbox 110. This is illustrated in FIG. 3. Message recipient 126 accesses MMMS 106 by using the telephone number of MMMS 106 that was given to him or her in the alternative access instructions, and logs into mailbox 111 using the identifier/password that was given to him or her in the alternative access instructions, at step 300. Alternatively, if mailbox 111 was not created and the message was retained in mailbox 110, message recipient 126 uses the identifier/password to log into mailbox 110, in response to which he or she is given access only to the one message with which the password is associated. In response, message recipient 126 is provided with conventional incoming-message retrieval functions (i.e., "reply to sender" functions) with respect to mailbox 111 or with respect to the one message in mailbox 110, at step 302. This means that message recipient 126 can now redirect and/or retrieve the original message or any component thereof to and/or via any messaging system 114, 116, and 118 or terminal equipment 122 and 125 at his or her disposal.

After message recipient 126 has accessed mailbox 111 or 110 and logged off, at step 304, or if message recipient 126 has not accessed mailbox 111 or 110 within a predetermined period of time (e.g., one week), at step 306, MMMS 106 deletes mailbox 111 and its contents or deletes the original message from mailbox 110, at step 308. The alternative-access functionality thus comes to an end with respect to this message, at step 310.

In an alternative embodiment of the invention, the functionality of alternative access program 113 and the data in support thereof may be implemented in CDDM 121 instead of in MMMS 106. In that case, invocation of the "send" function on MMMS 106 results in delivery of the message to CDDM 121, whereupon CDDM 121 performs the alternative access functions, including causing MMMS 106 to create a mailbox 111 for message recipient 126 when necessary, and to assign a password thereto. Then, if the representative message is to be delivered to e-mail system 118, CDDM 121 effects the delivery as in the above-described illustrative example; otherwise CDDM 121 returns the representative message to MMMS 106 for conventional delivery.

Of course, various changes and modifications to the illustrative embodiments described above will be apparent to those skilled in the art. For example, alternative access program 113 may be invoked not only for partial message delivery as in the illustrative example, but rather may be invoked for all cross-domain delivery (outside of MMMS 106), or for all message delivery, or only when selected by the message originator. Or, the unique identifier/password may be selected and assigned by the sender at the sender's option. Also, retrieval of the original message may be accomplished via any retrieval mechanism supported by MMMS 106 (e.g., Web Browser, terminal emulator, Telnet session, FTP session, AT&T Vistium® workstation, etc.). Furthermore, the message originator may address the original message to multiple recipients, in which case each recipient who is unable to receive the original message is sent a different representational message containing a unique identifier/password, and the original message is not deleted from the originator's mailbox until all recipients have accessed it or the predetermined time has expired. Such changes and modifications can be made without departing from the spirit and the scope of the invention and without diminishing its attendant advantages. It is therefore intended that such changes and modifications be covered by the following claims.

The invention claimed is:

1. A method of providing access to a message by a recipient of the message, comprising the steps of:

in response to a message sender requesting a messaging system in which a message is stored to send the message to a message recipient, determining whether the message recipient would receive the message at a destination of the recipient;

in response to determining that the message recipient would receive the message at the destination, sending the message from the messaging system to the destination of the recipient;

in response to determining that the message recipient would not receive the message at the destination, sending to the recipient a notification of the message along with an identifier of the message in the messaging system; and in response to the message recipient accessing the messaging system from an endpoint other than the destination and providing the identifier to the messaging system, providing the message recipient with access in the messaging system to the message that is identified by the identifier.

2. The method of claim 1 wherein:

the step of providing the message recipient with access comprises the step of in response to the message recipient logging into the messaging system with the identifier, providing the message recipient with access to the message in the messaging system.

3. The method of claim 1 wherein:

the messaging system is a multi-media messaging system;

the message comprises two or more message components each expressed in a different medium; and the step of determining comprises the step of determining whether the message recipient would receive all of the message components of the message at the destination.

4. The method of claim 3 wherein:

the step of sending to the recipient a notification comprises the step of in response to determining that the message recipient would not receive all of the message components of the message at the destination, sending to the destination of the message recipient those message components that the message recipient would receive at the destination along with the identifier.

5. The method of claim 1 wherein:

the step of determining comprises the step of in response to the message sender requesting the messaging system in which the message is stored to send the message to an address of the message recipient, determining whether the message recipient would receive the message at the address; and the step of sending a notification comprises the step of sending the notification of the message to the address.

6. The method of claim 1 wherein:

the messaging system is a multi-media messaging system;

the message comprises two or more message components each expressed in a different medium;

the step of determining comprises the step of in response to the message sender requesting the messaging system in which the message is stored to send the message to an address of the message recipient, determining whether the message recipient would receive all of the message components of the message at the address; and the step of sending to the recipient a notification of the message comprises the step of in response to determining that the message recipient would not receive all of the message components of the message at the address, sending to the address a copy of at least a portion of the message along with the identifier.

7. A method of providing access to a message by a recipient of the message, comprising the steps of:

in response to a message sender requesting a messaging system in which a message is stored to send the message to a message recipient, attempting to determine whether the message recipient is able to receive the message;

in response to succeeding in determining that the message recipient is able to receive the message, sending the message from the messaging system to the recipient;

in response to failing to determine that the message recipient is able to receive the message, sending to the recipient at least a portion of the message along with an identifier of the message in the messaging system; and in response to the message recipient accessing the messaging system and providing the identifier to the messaging system, providing the message recipient with access in the messaging system to the message that is identified by the identifier.

8. The method of claim 7 wherein:

the step of providing the message recipient with access comprises the step of in response to the message recipient logging into the messaging system with the identifier, providing the message recipient with access to the entire message in the messaging system.

9. The method of claim 7 wherein:

the messaging system is a multi-media messaging system;

the message comprises two or more message components each expressed in a different medium; and the step of attempting to determine comprises the step of attempting to determine whether the message recipient is able to receive all of the message components of the message.

10. The method of claim 9 wherein:

the step of sending to the recipient at least a portion of the message comprises the step of in response to failing to determine that the message recipient is able to receive all of the message components of the message, sending to the message recipient a copy of the message along with the identifier.

11. The method of claim 7 wherein:

the step of attempting to determine comprises the step of in response to the message sender requesting the messaging system in which the message is stored to send the message to an address of the message recipient, attempting to determine whether the message recipient is able to receive the message at the address; and the step of providing comprises the step of in response to the message recipient accessing the messaging system from an address other than the address, providing the message recipient with the access in the messaging system to the message that is identified by the identifier.

12. The method of claim 7 wherein:

the messaging system is a multi-media messaging system;

the message comprises two or more message components each expressed in a different medium;

the step of attempting to determine comprises the step of in response to the message sender requesting the messaging system in which the message is stored to send the message to an address of the message recipient, attempting to determine whether the message recipient is able to receive all of the message components of the message at the address; and the step of sending to the recipient at least a portion of the message comprises the step of in response to failing to determine that the message recipient is able to receive all of the message components of the message at the address, sending to the address a copy of at least the portion of the message along with the identifier.

13. A method of providing access to a message by a recipient of the message, comprising the steps of:

in response to a message sender requesting a multi-media messaging system, in which is stored a message comprising two or more message components each expressed in a different medium, to send the message to an address of the message recipient, sending to the address a notification of the message comprising at least one of the message components along with an identifier of the message in the multi-media messaging system; and in response to the message recipient logging into the multi-media messaging system with the sent identifier, providing the message recipient with access in the multi-media messaging system to all of the message components of only the message that is identified by the identifier.

14. The method of claim 13 wherein:

the step of sending comprises the step of sending to the address a copy of the message along with the identifier.

15. The method of claim 13 wherein:

the step of sending comprises the steps of in response to the requesting, attempting to determine which media would be received at the address; and in response to success in determining that not all media in which the message components are expressed would be received at the address, sending to the address a copy of those message components that are expressed in media which would be received at the address along with the identifier.

16. The method of claim 15 wherein:

the step of sending further comprises the step of in response to a failure to determine which media would be received at the address, sending to the address a copy of the entire message along with the identifier.

17. The method of claim 16 wherein:

the step of sending further comprises the step of in response to success in determining that all media in which the message components are expressed would be received at the address, sending the message to the address without the identifier.

18. The method of claim 15 wherein:

the step of sending further comprises the step of in response to success in determining that all media in which the message components are expressed would be received at the address, sending the message to the address.

19. The method of claim 13 wherein:

the step of sending comprises the steps of in response to the requesting, creating a mailbox for the recipient;

storing the message in the mailbox created for the recipient; and sending to the address the notification along with instructions for logging into the mailbox created for the recipient.

20. The method of claim 19 further comprising the step of:

in response to the message recipient either not logging into the mailbox created for the recipient within a predetermined period of time or logging into the mailbox created for the recipient and then logging off, deleting the mailbox created for the message recipient from the messaging system.

21. The method of claim 13 wherein:

the step of sending comprises the steps of in response to the requesting, assigning a password to the message, said message being stored in a mailbox of the sender in the multi-media messaging system; and sending to the address the notification along with instructions for logging into the mailbox of the sender with the password.

22. The method of claim 13 wherein:

the step of sending comprises the steps of in response to the requesting, assigning a password to the message in the multi-media messaging system; and sending to the address the notification along with the password and instructions for logging into the multi-media messaging system with the password.

23. The method of claim 22 wherein:

the step of providing the message recipient with access comprises the step of in response to the message recipient logging into the messaging system with the password, providing the message recipient with access only to the message in the multi-media messaging system.

24. The method of claim 13 wherein:

the message sender is, and the message recipient is not, a subscriber of the multi-media messaging system; and the address is an address of another messaging system, of which the message recipient is a subscriber.

25. The method of claim 24 wherein:

the other messaging system is a mono-media messaging system.

26. The method of claim 24 wherein:

the step of sending comprises the steps of determining which media can be handled by the other messaging system; and in response to the determining, sending to the address those message components that are expressed in media which can be handled by the other messaging system, along with the identifier.

27. The method of claim 13 further comprising the step of:

in response to the message recipient either not logging into the multi-media messaging system with the identifier within a predetermined period of time, or logging into the multi-media messaging system with the identifier and then logging off of the multi-media messaging system, deleting the message from the multi-media messaging system.

28. A messaging system comprising:

a memory for storing a message;

means responsive to a request from a message sender to send the message to a message recipient, for determining whether the message recipient would receive the message at a destination of the recipient;

means responsive to a determination that the message recipient would receive the message at the destination, for sending the message from the messaging system to the destination of the recipient;

means responsive to a determination that the message recipient would not receive the message at the destination, for sending to the recipient a notification of the message along with an identifier of the message in the messaging system; and means responsive to the message recipient accessing the messaging system from an endpoint other that the destination and providing the identifier to the messaging system, for providing the message recipient with access to the message that is stored in the memory and identified by the identifier.

29. The messaging system of claim 28 wherein:

the means for providing the message recipient with access respond to the message recipient logging into the messaging system with the identifier, by providing the message recipient with access to the message.

30. The messaging system of claim 28 wherein:

the messaging system is a multi-media messaging system;

the message comprises two or more message components each expressed in a different medium; and the means for determining comprise means for determining whether the message recipient would receive all of the message components of the message at the destination.

31. The messaging system of claim 30 wherein:

the means for sending to the recipient a notification comprise means responsive to a determination that the message recipient would not receive all of the message components of the message at the destination, for sending to the destination of the message recipient those message components that the message recipient would receive at the destination along with the identifier.

32. The messaging system of claim 28 wherein:

the means for determining comprise means responsive to a request from the message sender to send the message to an address of the message recipient, for determining whether the message recipient would receive the message at the address; and the means for sending comprise means for sending the notification of the message to the address.

33. The messaging system of claim 28 wherein:

the messaging system is a multi-media messaging system;

the message comprises two or more message components each expressed in a different medium;

the means for determining comprise means responsive to a request from the message sender to send the message to an address of the message recipient, for determining whether the message recipient would receive all of the message components of the message at the address; and the means for sending to the recipient a notification of the message comprise means responsive to a determination that the message recipient would not receive all of the message components of the message at the address, for sending to the address a copy of at least a portion of the message along with the identifier.

34. A messaging system comprising:

a memory for storing a message;

means responsive to a request from a message sender to send the message to a message recipient, for attempting to determine whether the message recipient is able to receive the message;

means responsive to success in determining that the message recipient is able to receive the message, for sending the message from the messaging system to the recipient;

means responsive to failure to determine that the message recipient is able to receive the message, for sending to the recipient at least a portion of the message along with an identifier of the message in the messaging system; and means responsive to the message recipient accessing the messaging system and providing the identifier to the messaging system, for providing the message recipient with access to the message that is stored in the memory and identified by the identifier.

35. The messaging system of claim 34 wherein:

the means for providing the message recipient with access respond to the message recipient logging into the messaging system with the identifier, by providing the message recipient with access to the entire message.

36. The messaging system of claim 34 wherein:

the messaging system is a multi-media messaging system;

the message comprises two or more message components each expressed in a different medium; and the means for attempting to determine comprise means for attempting to determine whether the message recipient is able to receive all of the message components of the message.

37. The messaging system of claim 36 wherein:

the means for sending to the recipient at least a portion of the message comprise means responsive to failure to determine that the message recipient is able to receive all of the message components of the message, for sending to the message recipient a copy of the message along with the identifier.

38. The messaging system of claim 34 wherein:

the means for attempting to determine comprise means responsive to a request from the message sender to send the message to an address of the message recipient, for attempting to determine whether the message recipient is able to receive the message at the address; and the means for providing comprise means responsive to the message recipient accessing the messaging system from an address other than the address, for providing the message recipient with the access in the messaging system to the message that is identified by the identifier.

39. The messaging system of claim 34 wherein:

the messaging system is a multi-media messaging system;

the message comprises two or more message components each expressed in a different medium;

the means for attempting to determine comprise means responsive to a request from the message sender to send the message to an address of the message recipient, for attempting to determine whether the message recipient is able to receive all of the message components of the message at the address; and the means for sending to the recipient a at least a portion of the message comprise means responsive to failure to determine that the message recipient is able to receive all of the message components of the message at the address, for sending to the address a copy of at least the portion of the message along with the identifier.

40. A messaging system comprising:

a memory for storing a message comprising two or more message components each expressed in a different medium;

means responsive to a request from a message sender to send the message to an address of a message recipient, for sending instead to the address a notification of the message comprising at least one of the message components along with an identifier of the message in the multi-media messaging system; and means responsive to the message recipient logging into the multi-media messaging system with the sent identifier, for providing the message recipient with access in the multi-media messaging system to all of the message components of only the stored message that is identified by the identifier.

41. The messaging system of claim 40 wherein:

the sending means comprise means for sending to the address a copy of the message along with the identifier.

42. The messaging system of claim 40 wherein:

the means for sending comprise means responsive to the request, for attempting to determine which media would be received at the address; and means responsive to success in determining that not all media in which the message components are expressed would be received at the address, for sending to the address a copy of those message components that are expressed in media which would be received at the address along with the identifier.

43. The messaging system of claim 42 wherein:

the sending means further comprise means responsive to a failure to determine which media would be received at the address, for sending to the address a copy of the entire message along with the identifier.

44. The messaging system of claim 43 wherein:

the sending means further comprise means responsive to success in determining that all media in which the message components are expressed would be received at the address, for sending the message to the address without the identifier.

45. The messaging system of claim 42 wherein:

the means for sending further comprise means responsive to success in determining that all media in which the message components are expressed would be received at the address, for sending the message to the address.

46. The messaging system of claim 40 wherein:

the means for sending comprise means responsive to the request, for creating a mailbox for the recipient;

means for storing the message in the mailbox created for the recipient; and means for sending to the address the notification along with instructions for logging into the mailbox created for the recipient.

47. The messaging system of claim 46 further comprising:

means responsive to the message recipient either not logging into the mailbox created for the recipient within a predetermined period of time or logging into the mailbox created for the recipient and then logging off, for deleting the mailbox created for the message recipient from the messaging system.

48. The messaging system of claim 40 wherein:

the means for sending comprise means responsive to the request, for assigning a password to the message, said message being stored in a mailbox of the sender in the memory; and means for sending to the address the notification along with instructions for logging into the mailbox of the sender with the password.

49. The messaging system of claim 40 wherein:

the means for sending comprise means responsive to the request, for assigning a password to the message in the memory of the multi-media messaging system; and means for sending to the address the notification along with the password and instructions for logging into the multi-media messaging system with the password.

50. The messaging system of claim 49 wherein:

the means for providing the message recipient with access comprise means responsive to the message recipient logging into the messaging system with the password, for providing the message recipient with access only to the message in the memory of the multi-media messaging system.

51. The messaging system of claim 40 wherein:

the message sender is, and the message recipient is not, a subscriber of the multi-media messaging system; and the address is an address of another messaging system, of which the message recipient is a subscriber.

52. The messaging system of claim 51 wherein:

the other messaging system is a mono-media messaging system.

53. The messaging system of claim 51 wherein:

the means for sending comprise means for determining which media can be handled by the other messaging system; and means responsive to the determining means, for sending to the address those message components that are expressed in media which can be handled by the other messaging system, along with the identifier.

54. The messaging system of claim 40 further comprising:

means responsive to the message recipient either not logging into the multi-media messaging system with the identifier within a predetermined period of time, or logging into the multi-media messaging system with the identifier and then logging off of the multi-media messaging system, for deleting the message from the multi-media messaging system.

* * * * *